July 1, 1969
H. G. OLTMAN, JR., ET AL
3,453,456
ULTRASONIC TRANSDUCER
Filed Oct. 27, 1966
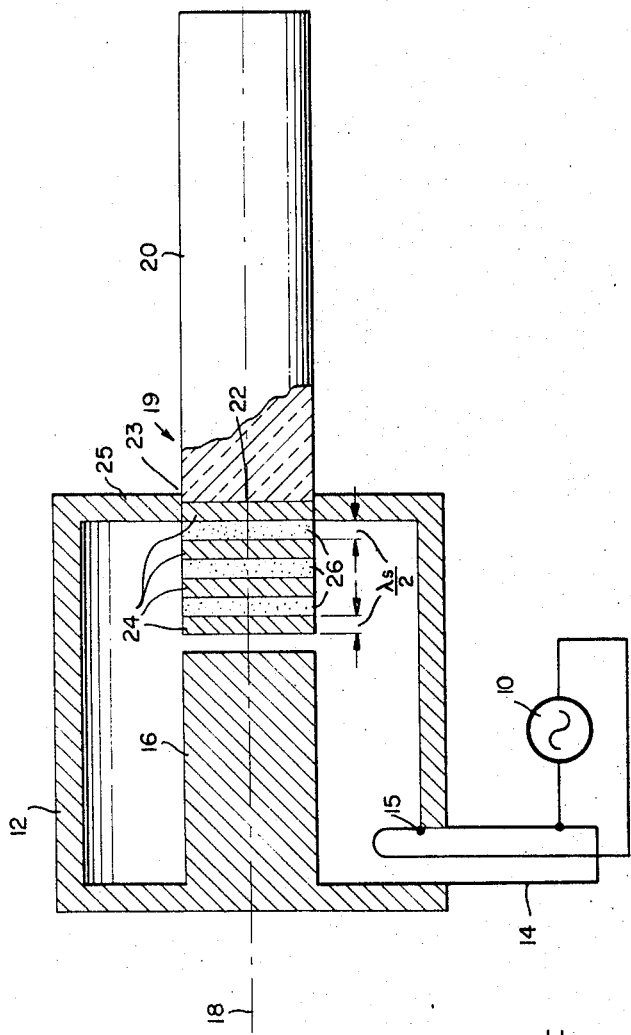
Henry G. Oltman, Jr.,
Irving Kaufman,
INVENTORS.
BY.
Jerry G. Dinardo
AGENT.

United States Patent Office 3,453,456
Patented July 1, 1969

3,453,456
ULTRASONIC TRANSDUCER
Henry G. Oltman, Jr., Woodland Hills, Calif., and Irving Kaufman, Tempe, Ariz., assignors to TRW Inc., Redondo Beach, Calif., a corporation of Ohio
Filed Oct. 27, 1966, Ser. No. 590,002
Int. Cl. H01v 7/00
U.S. Cl. 310—8.2         15 Claims

ABSTRACT OF THE DISCLOSURE

This invention relates to a sandwich structure of an ultrasonic transducer. The sandwich structure includes alternate layers of piezoelectric material and conductive material such as metal, and each layer of material is one-half wavelength in thickness. This construction allows each piezoelectric element to be reinforced so that a composite signal is achieved that is of greater amplitude than any signal of the individual layers.

---

This invention relates to ultrasonic transducers, and more particularly to devices for converting electromagnetic waves to ultrasonic waves as short as microwaves.

There is a need in a number of systems for delaying modulated signals of microwave frequencies by microseconds, or even milliseconds. While the delays can be achieved by conventional long path electromagnetic delays, the physical dimensions of the delay systems can become cumbersome. For example, to achieve a delay of 30 microseconds by means of a coaxial transmission line would require a cable almost 6,000 meters in length.

On the other hand, if one were to use ultrasonic waves, whose velocity is only about 5,000 meters per second, the length of ultrasonic line required would be only 0.15 meter. This very reasonable length alone justifies the consideration of microwave ultrasonics for delay purposes.

In addition to delay line applications, the ultrasonic field has recently aroused additional interest because of the development of the piezoelectric amplifier.

One known method of transducing from electromagnetic to ultrasonic waves involves the use of a plate of piezoelectric material such as single crystal quartz, that is acoustically bonded to an ultrasonic, or mechanical waveguide. By impressing a voltage across the plate, ultrasonic waves are generated. One requirement for efficient transducing according to this method is that the thickness of the quartz plate be one-half of the acoustic wavelength. At 10 megacycles, the required thickness is .010 inch, and transducers of this thickness are readily available. To generate a 1,000 megacycle signal requires a thickness of only .0001 inch, and no transducer of this small thickness is available. For this reason other kinds of transducers are needed to generate microwave ultrasonic waves.

One known method of generating coherent mechanical vibrations of microwave frequencies, also called "microwave phonons," consists of inserting a rod of piezoelectric crystal material in a reentrant microwave cavity and subjecting the piezoelectric rod to a microwave field. The discontinuity in piezoelectric stress at the surface of the rod generates an ultrasonic wave which propagates down the rod. While some acoustic coupling does occur, the amount is not sufficient to provide efficient transducer action even with a high-Q microwave cavity. The reason is that this coupling effectively utilizes only the small voltage occurring across about ¼ of an acoustic wavelength of the crystal. An efficient transducer would utilize the entire voltage that appears across the gap between the cavity and the rod.

To achieve more efficient coupling of the microwave field to the acoustic element, two other devices have been proposed. One of these devices is known as the "depletion layer transducer" and the other one is known as the "diffusion layer transducer." In the "depletion layer transducer," a metallic or P-type layer of material is deposited on an N-type piezoelectric semiconductor to form a P–N junction diode. By DC back-biasing this device, a depletion or high resistance layer is created. This high resistance layer is in series with the relatively low resistance of the bulk of the piezoelectric semiconductor, so that most of the applied voltage appears across the depletion layer. The piezolectric property of the semiconductor and the applied voltage cause an ultrasonic (mechanical) wave to be generated. By changing the DC back-biasing voltage, the depletion layer thickness is changed to allow electronic tuning of the transducer to the optimum thickness required at a particular frequency.

In the "diffusion layer transducer," a high resistance region is formed at the end of a rod of piezoelectric semiconductive material such as cadmium sulfide. The high resistance region is formed by depositing copper at the end of the rod and heating the rod to diffuse some of the copper into a thin diffusion layer. The copper atoms replace some of the cadmium ions, thus creating electronic traps and thereby increasing the resistivity of the layer. Most of the applied voltage appears across the high resistance diffusion layer so that efficient transducing action can occur.

In both the aforementioned piezoelectric semiconductive devices, the applied voltage appears across a very thin stratum equal to one-half the acoustic wavelength. The high capacitance of the thin stratum inherently renders the transducer a very low impedance device, and this low shunting impedance limits the high frequency efficiency of such devices.

In copending U.S. application of Eugene C. Crittenden, Jr., Ser. No. 509,583, filed Nov. 24, 1965, entitled "Hypersonic Transducer," there is disclosed a transducer for translating electromagnetic wave energy to ultrasonic wave energy of wavelengths as short as microwaves. In that application, a piezoelectric device is produced having alternate thin regions of high and low electrical impedance, with each region being equal in width along the axis of sound propagation to one-half wavelength of the acoustical signal to be generated. The applied voltage is divided equally across the high impedance regions, with little or no voltage appearing across the low impedance regions. The combined effect of the ultrasonic waves produced in the high impedance regions is the same as if the entire voltage appeared across a single half-wave element. Yet the effective capacitance of the device is decreased by the number of high impedance regions that are present, according to the well-known relationship of capacitances in series.

In the Crittenden application referred to above, a piezoelectric device is formed from a single body of semiconductive material that is both piezoelectric and photo conductive. Light energy is coupled to the semiconductive body in such a way as to produce alternate light and dark areas and thereby to photoconductively establish alternate regions of low and high electrical impedance, respectively.

Considered from one aspect, the present invention is an improvement over the device disclosed in the aforementioned copending application. The present invention utilizes a stacked array of thin layers of two different materials having differing electrical and acoustic properties. In accordance with a preferred embodiment especially advantageous at high microwave frequencies, a rod of material of high electrical and acoustic conductivity is provided at one end thereof with a sandwish of alternate thin film layers of electrically conductive and piezoelectric materials. The conductive layers are acoustically inert in that they are incapable of generating acoustic waves, but they are nevertheless capable of conducting acoustic waves generated by the piezoelectric layers. The thin film layers each have a thickness equal to one-half wavelength of the desired acoustic signal.

An applied electromagnetic field distributes itself serially through regions of uniform and equal field strength only in the piezoelectric layers, with the conductive layers being essentially field free. The oscillating electromagnetic field drives the piezoelectric layers in such a way as to set up standing acoustic waves, of which the alternate half-wavelengths are driven by the electric field. The excitation of the piezoelectric layers produces a cumulative effect by which the ultrasonic waves generated in the individual piezoelectric layers reinforce each other. In this way strong acoustic coupling between the piezoelectric layers is achieved.

For lower frequencies, the conductive and piezoelectric layers can be formed of thin plates. A microwave ultrasonic transducer formed from thin layers of piezoelectric and conductive elements according to the invention does not utilize optical effects for its operation. Simplification in construction and operation is thereby achieved.

The single figure of the drawing is a schematic view of a preferred form of a microwave ultrasonic transducer constructed according to the invention.

Referring to the drawing, a source 10 of radio frequency electromagnetic energy, such as microwave energy, is coupled to a microwave cavity 12 through a coupling means, such as a coaxial line 14 and loop 15. The cavity 12 is preferably a reentrant type cavity of cylindrical form and includes a cylindrical rod 16 extending from one end wall thereof along the longitudinal axis 18 of the cavity 12.

A piezoelectric device 19 is mounted in the other end wall of the cavity 12 opposing the rod 16. The piezoelectric device 19 includes an acoustic waveguide 20, such as a solid cylindrical rod of quartz or other acoustic transmitting material. The waveguide 20 is coaxial with the rod 16. The waveguide 20 has one end surface 22 thereof disposed in an opening 23 formed in an end wall 25 of the cavity 12, with the main body of the waveguide 20 extending outside the cavity 12. The diameter of the waveguide 20 is substantially equal to that of the rod 16.

The cavity 12 provides a means of transforming the impedance of the coaxial line 14 to the optimum impedance for driving the piezoelectric device 19. Other means may be used for driving the piezoelectric device 19 at its optimum impedance, such as for example microwave transmission line transformers.

In accordane with the invention, the end surface 22 of the waveguide 20 is coated with a sandwich structure of alternate thin film layers 24 and 26 of electrically conductive material and piezoelectric material, respectively. Each of the layers 24 and 26 has a thickness equal to one-half wavelength ($\lambda_s/2$) of the acoustic wave to be generated.

The layers 24 and 26 may be formed by vacuum deposition, starting first with a conductive layer 24, then a piezoelectric layer 26, another conductive layer 24, and so on, with the final layer deposited being either a conductive or a piezoelectric layer. For generating a 1,000 megacycle ultrasonic wave, the thickness of each of the layers 24 and 26 would be about 2.5 microns, for example.

Suitable materials for the conductive layers 24 are gold and aluminum. For the piezoelectric layers 26, a semiconductive material such as carmium sulfide or zinc oxide is preferred. Cadmium sulfide may be vapor deposited while the deposition surface is maintained above 150° C. For a more complete description of a method of vapor depositing cadmium sulfide, reference is made to an article by J. de Klerk and E. F. Kelly in Review of Scientific Instruments, volume 36, page 506, dated 1965. Zinc oxide films may be prepared according to the method disclosed in an article by G. A. Rozganyi and W. J. Polito, in Applied Physics Letters, volume 8, page 220, dated May 1, 1966.

The coated end of the acoustic waveguide 20 is positioned with the first conductive layer 24 in contact with the end wall 25 of the cavity 12 to permit electrical currents from the cavity end wall 25 to flow in the first layer 24. The last layer (conductive layer 24 as shown or piezoelectric layer 26) is disposed close to, but preferably not touching, the end of the rod 16, for close coupling. While the last layer (either layer 24 or 26) may be allowed to contact the rod 16, this would result in some acoustic loss by conduction of the generated acoustic signal to the rod 16.

It is seen that the electrical capacitance of the sandwich structure formed by the conductive and piezoelectric layers 24 and 26 consists of a number of elemental capacitors connected in series. Each elemental capacitor consists of a piezoelectric layer 26 sandwiched between two conductive layers 24. Thus the total capacitance is decreased in proportion to the number of piezoelectric layers 26 so that the high frequency shunting effect may be reduced.

In operation, a high frequency electromagnetic signal generated by the source 10 and having a frequency equal to that of the acoustic wave to be generated is coupled into the cavity 12. In the cavity 12, the electric component of the high frequency field is coupled to the sandwich structure formed by the alternate layers 24 and 26. The rod 16 serves to concentrate the electrical field in the sandwich structure, with the direction of the electric field oriented parallel to the axis 18 for longitudinal excitation of the piezoelectric layers 26.

Since the piezoelectric layers 26 have a much higher electrical impedance than the conductive layers 24, substantially all of the electric field appears in the piezoelectric layers 26, with little or no field appearing in the conductive layers 24. In other words, the total applied electric field divides equally in the piezoelectric capacitance, since the piezoelectric layers 26 are all of the same thickness and area.

The alternating electric field appearing in each piezoelectric layer 26 drives the latter into ultrasonic vibrations of an acoustic frequency having a wavelength $\lambda_s$ equal to twice the thickness of each layer 26. Since the piezoelectric layers 26 are a half wavelength apart, the individual acoustic vibrations produce a composite acoustic signal of greater amplitude than any of the individual vibrations. The output acoustic wave is transmitted through the acoustic waveguide 20 where it may be coupled to a utilization device.

The embodiments of the invention in which an exclusive property or privilege is claimed are defined as follows:

1. An ultrasonic transducer, comprising:
   a piezoelectric device including a sandwich structure of alternate layers of piezoelectric and high electrically conductive materials, there being at least two piezoelectric layers and each of said layers of said sandwich structure having a thickness equal to one-half a predetermined wavelength;
   and means for exciting said sandwich structure with an electromagnetic field of a wavelength equal to said predetermined wavelength, with said piezoelectric layers electrically connected in series.

2. The invention according to claim 1, wherein said piezoelectric layers are formed from semiconductive material.

3. The invention according to claim 2, wherein said semiconductive material is zinc oxide.

4. The invention according to claim 2, wherein said semiconductive material is cadmium sulfide.

5. The invention according to claim 1, wherein said piezoelectric and conductive layers are vacuum deposited films.

6. The invention according to claim 1, wherein said exciting means includes a microwave reentrant cavity in which said sandwich structure is disposed.

7. The invention according to claim 1, wherein said piezoelectric device comprises a rod of acoustic transmitting material, an end of which is coated with said sandwich structure.

8. The invention according to claim 1, wherein each of said layers is of the order of 2.5 microns thick.

9. The invention according to claim 1, wherein said conductive layers are made of metal.

10. A piezoelectric device, comprising:
a rod of acoustic transmitting material;
and on one end of said rod a sandwich structure of alternate layers of piezoelectric and high electrically conductive materials;
there being at least two piezoelectric layers, and said layers of said sandwich structure being of equal thickness.

11. The invention according to claim 10, wherein said layers are vacuum deposited films.

12. The invention according to claim 10, wherein said piezoelectric layers are formed from semiconductive material.

13. The invention according to claim 12, wherein said semiconductive material is a material selected from the group consisting of cadmium sulfide and zinc oxide.

14. The invention according to claim 10, wherein said conductive layers are formed from metal.

15. The invention acording to claim 10, wherein each of said layers is of the order of 2.5 microns thick.

References Cited

UNITED STATES PATENTS

| | | | |
|---|---|---|---|
| 2,787,777 | 4/1957 | Camp | 340—10 |
| 2,806,155 | 9/1957 | Rotkin | 333—30 |
| 2,861,247 | 11/1958 | McSkimin | 310—8.3 |
| 3,012,211 | 12/1961 | Mason | 333—30 |
| 3,321,647 | 5/1967 | Tien | 310—8.2 |
| 3,240,962 | 3/1966 | White | 310—8.3 |
| 3,252,722 | 5/1966 | Allen | 333—30 |
| 3,292,018 | 12/1966 | Clynes | 310—9.8 |
| 3,371,264 | 2/1968 | Carr | 310—8.2 |
| 3,365,590 | 1/1968 | Lobdell | 310—8.3 |
| 3,389,274 | 6/1968 | Robertson | 310—8.3 |

OTHER REFERENCES

Vol. 3, No. 2, Physical Review Letters, July 15, 1959, pp. 83 and 84 entitled Excitation of Hypersonic Waves by Ferromagnetic Resonance.

J D MILLER, *Primary Examiner.*

U.S. Cl. X.R.

310—8.3, 8.6, 9.7; 321—86; 333—30, 72